J. ALLGAIER.
Velocipede.
No. 89,964.                                    Patented May 11, 1869.
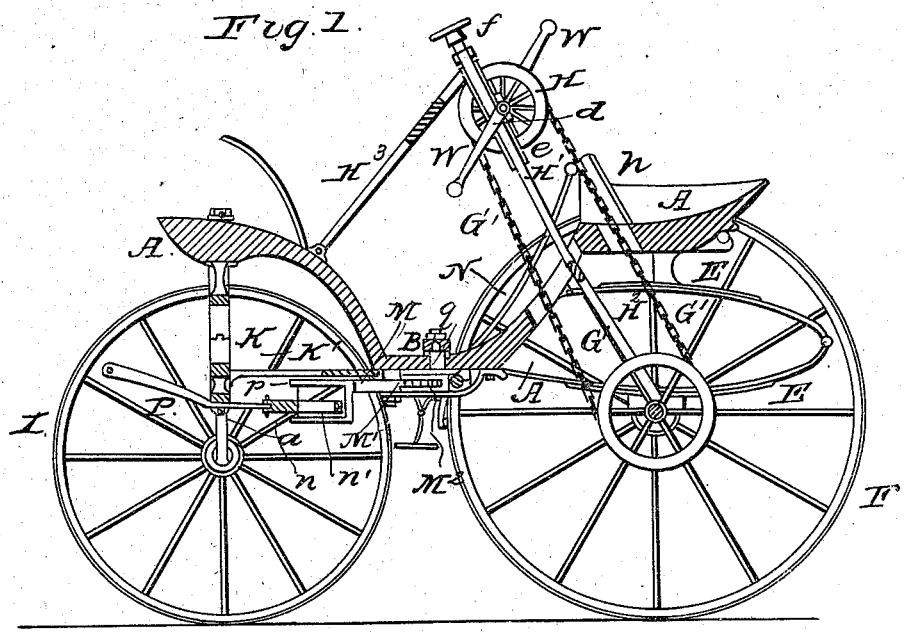
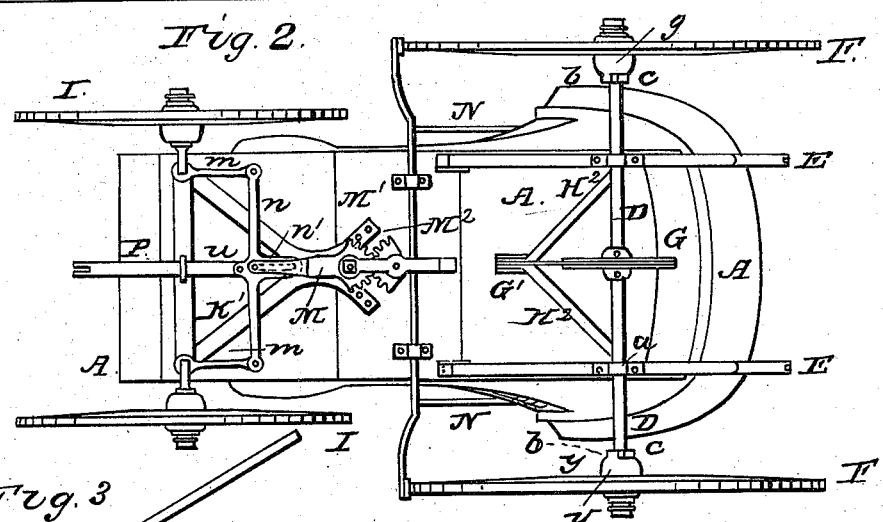
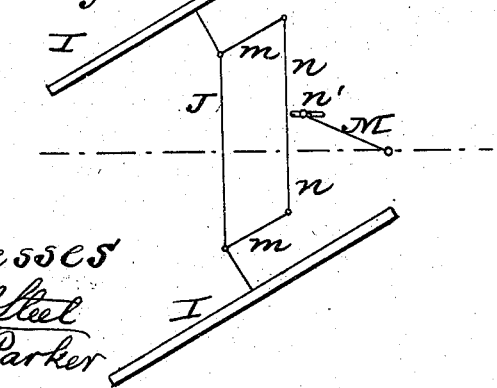
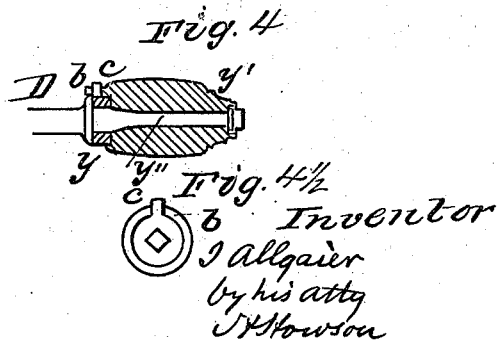

2 Sheets—Sheet 2.
J. ALLGAIER.
Velocipede.
No. 89,964. Patented May 11, 1869.
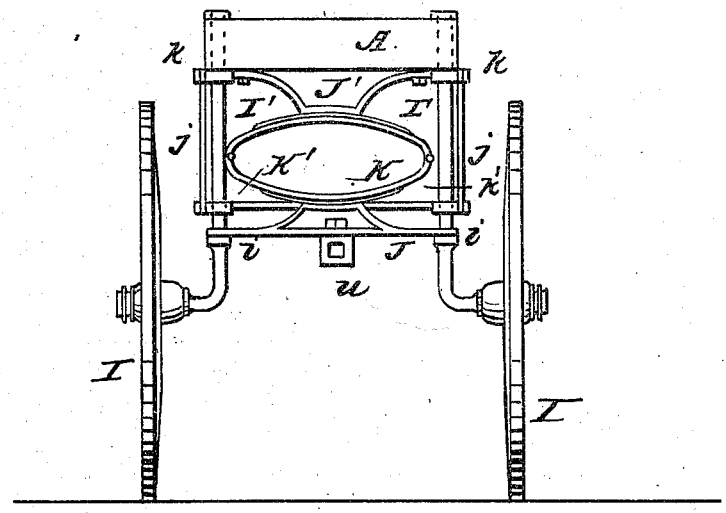
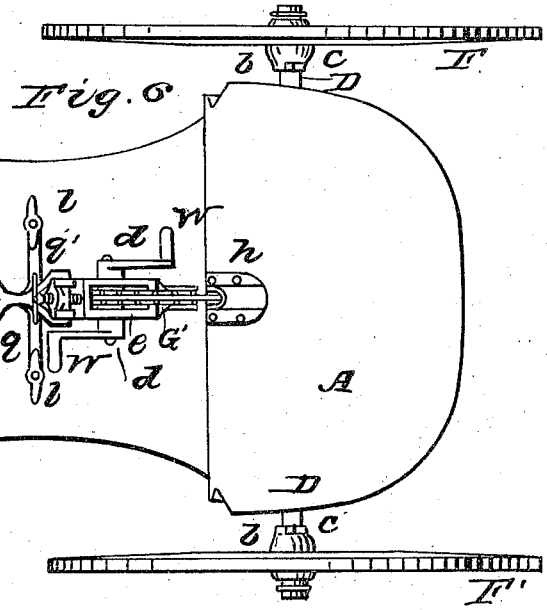

United States Patent Office.

JOHN ALLGAIER, OF PHILADELPHIA, PENNSYLVANIA.

*Letters Patent No. 89,964, dated May 11, 1869.*

---

IMPROVEMENT IN VELOCIPEDES.

---

The Schedule referred to in these Letters Patent and making part of the same.

---

*To all whom it may concern:*

Be it known that I, JOHN ALLGAIER, of Philadelphia, Pennsylvania, have invented certain Improvements in Hand-Motive Carriages and Velocipedes; and I do hereby declare the following to be a full, clear, and exact description of the same.

My invention relates to improvements in that class of carriages which is driven by hand, although partly applicable to velocipedes; my said improvements, which are fully described hereafter, having been designed mainly with the view of enabling the operators to turn the vehicles abruptly.

In order to enable others skilled in the art to make and use my invention, I will now proceed to describe its construction and operation, reference being had to the accompanying drawing, which forms a part of this specification, and in which—

Figure 1, drawing No. 1, is a vertical section of my improved hand-motive carriage.

Figure 2, an inverted plan view of the same.

Figure 3, a diagram illustrating part of my invention.

Figures 4 and 4½, detached views of portions of one of the wheels and axle.

Figure 5, drawing No. 2, a front view of the carriage, and

Figure 6, a plan view of the same.

Similar letters refer to similar parts throughout the several views.

The body of the carriage consists of the seat A, bottom B, and front, C, which may be varied in shape and arrangement, without affecting my invention.

D is the rear axle, turning in boxes $a$ $a$, secured to ordinary carriage-springs E E, figs. 1 and 2, which are connected to the body in the usual manner.

While the axle turns freely in the boxes, the wheels F F can turn on the axle to an extent limited by a projection, $b$, on the hub of each wheel, and a like projection, $c$, on the axle, figs. 4 and 4½, so that each wheel can make nearly one entire revolution, independently of the axle. This is an important feature of my invention, and its object will be rendered apparent hereafter.

To the rear axle D, midway between the opposite springs, is secured a wheel, G, having teeth adapted to the links of an endless chain, G', which passes round a similar wheel, H, secured to a spindle, $d$, which is arranged to turn in suitable bearings on a slide, $e$, figs. 1 and 6, the latter being adapted to the frame H¹, legs H², from which extend to and are secured to the spring, blocks of the rear axle; and from the frame H¹ to the front C of the body, extends the stay-rod H³.

The slide $e$ is controlled by a screw, $f$, figs. 1 and 6, turning in the frame H, and furnished with a suitable handle.

It should be here understood that the frame H¹ is so adjusted that the slide $e$, when operated by the screw $f$, will move in a plane parallel to a line drawn from the centre of the rear axle to the centre of the driving-pulley H.

By this arrangement the movement of the body of the carriage will have little or no effect on the driving-gear.

Openings must, of necessity, be made in the body of the carriage for the passage of the endless chain, and for the legs H² of the frame H¹, but neither these openings nor the chain will interfere with the comfort of the operator, as a shield, $h$, is secured to the seat A in such a position as to afford ample protection.

The front wheels I I are hung each to the bent end of a vertical spindle, I', as best observed on reference to fig. 5, drawing No. 2.

Each spindle has a collar, $i$, bearing against the under side of the spring-bed J, in which, also, the spindle turns.

Between the said spring-bed and the cross-bar J', secured to the body, intervenes the spring.

A stay, K', is secured to the under side of the body, and is so forked and projects so far forward, that in the outer ends turn the spindles I' I', and these ends of the stay are connected by rods $j$ $j$ to boxes $k$ $k$, which are secured to the body of the carriage, and through which project the said spindles I' I'. (See figs. 2 and 5.)

It will now be seen that while the spindles which carry the front wheels can turn freely, they serve as guides, steadied by the stay K', on which the body can move vertically to the limited extent permitted by the spring.

From each of the vertical spindles I' I', projects an arm, $m$, figs. 1 and 2, and the two arms are connected together by a rod, $n$, having a slot, through which passes a roller, $p$, on a pin in the forked arm of the lever M, which is hung to a pin projecting from the under side of the carriage-body.

A toothed segment, $m'$, forms a part of this lever, and is concentric with the pin on which the lever turns.

This segment gears into a similar segment, M², on a vertical spindle, $q$, which passes through the bottom B of the carriage-body, and turns in a suitable box.

To the upper end of the spindle $q$, is secured a lever, $q'$, on each end of which is arranged to swivel a foot-plate, $t$.

The operation of this part of my invention will be readily understood by reference to the diagram, fig. 3, and it will suffice to remark that by operating the foot-lever $q'$, the front wheels, can be caused to assume such an angle in respect to the hind wheels that the carriage can be turned round more abruptly than if the front wheels were hung to one axle in the usual manner. At the same time the plan described of hanging the wheels, and the mechanism for operating the same, enable me to reduce the carriage in length.

It may also be stated here that although I have shown, in the present instance, toothed segments for transmitting motion from the foot-spindle $q$ to the lever M, it will be obvious that other devices may be employed for the same purpose.

N is an ordinary brake-lever hung to the side of the body, and so arranged that it can be brought to bear on one of the driving-wheels F, if necessary.

An arm, P, passes through a staple, $w$, on the spring-bed J, and is jointed to the rod $n$, by which the arms $m$ of the two spindles I' I' are connected together.

This arm P, which may be of any desired length, serves as a pole by means of which the carriage may be drawn from place to place should it become necessary.

It has been remarked above that the hind wheels can turn on the axle D, to an extent limited by a lug, $b$, on the wheel, and a similar lug, $c$, on the axle.

This will be best observed on reference to the enlarged views, figs. 4 and 4½, drawing No. 1, where $y$ represents a washer adjusted to the square portion of round portion $y^2$ of the axle D, and $y^1$ represents the hub of a wheel on the the axle.

The lug $b$ is on the hub, and the lug $c$ on the washer; hence the wheel can turn independently of the axle nearly an entire revolution.

The advantages of this may be explained as follows, reference being had to fig. 6:

If the fore wheels have been so adjusted that the carriage is turning in the direction of the curved arrow, the wheel F alone will be the driving-wheel, as the wheel F', having to traverse a greater distance and turn faster than the wheel F, will revolve on the axle; hence it will be seen that greater facilities are afforded for turning abruptly, than if both wheels were secured to the axle.

If the carriage be turning in a direction contrary to that pointed out by the arrow, then the wheel F' becomes the driving-wheel, while the wheel F turns on its axle until its lug comes in contact with the lug of the wheel, when both wheels become drivers.

This part of my invention, as well as that which relates to the fore wheels, may be adopted in four-wheeled velocipedes.

The operator occupies the seat A, places a foot on each foot-plate $t$ of the foot-lever $q'$, and seizes one of the handles W W of the driving-spindle $d$, in each hand, when he has perfect command of the carriage, and can propel and turn the same with the greatest ease.

If desired, the carriage may be large enough for two operators, and the form and arrangement of the body, as well as of many of the above-described parts, may be modified without departing from the main features of my invention.

I claim as my invention, and desire to secure by Letters Patent—

1. The driving-spindle $d$, arranged to turn in a slide, $e$, controlled by a screw, $f$, when the said slide is adapted to a frame, H¹, arranged in respect to the centre of the axle D, and spindle, $d$, all substantially as and for the purpose specified.

2. The frame H¹, extending from the rear axle, and provided at the upper end with an adjustable slide, $e$, carrying a crank-shaft holding a pulley, H, all substantially as and for the purpose described.

3. The spindles I' I', with their arms $m$, in combination with the lever M, the foot-lever $q'$, and the intermediate devices, or any equivalent to the same, by which the movement of the foot-lever may be communicated to the lever M.

4. The combination of the guided spindles I' I', spring-bed J, spring K, and cross-bar, J'.

5. The arm P, adapted to a staple, $w$, in the spring-bed J, and hinged to the connecting-rod $n$, all substantially as and for the purpose set forth.

In testimony whereof, I have signed my name to this specification, in the presence of two subscribing witnesses.

JOHN ALLGAIER.

Witnesses:

JOHN WHITE,
LOUIS BOSWELL.